(12) United States Patent
Maung et al.

(10) Patent No.: US 9,965,424 B2
(45) Date of Patent: May 8, 2018

(54) USB SWITCH WITH MULTI-ROLE PORTS

(71) Applicant: TEXAS INSTRUMENTS INCORPORATED, Dallas, TX (US)

(72) Inventors: Win Naing Maung, Plano, TX (US); Suzanne Mary Vining, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 385 days.

(21) Appl. No.: 14/614,540

(22) Filed: Feb. 5, 2015

(65) Prior Publication Data

US 2015/0227485 A1 Aug. 13, 2015

Related U.S. Application Data

(60) Provisional application No. 61/937,191, filed on Feb. 7, 2014.

(51) Int. Cl.
  G06F 13/40 (2006.01)
  G06F 13/38 (2006.01)
  G06F 13/42 (2006.01)

(52) U.S. Cl.
  CPC ........ *G06F 13/4022* (2013.01); *G06F 13/385* (2013.01); *G06F 13/387* (2013.01);
  (Continued)

(58) Field of Classification Search
  CPC .. G06F 13/385; G06F 13/387; G06F 13/4022; G06F 13/4027; G06F 13/4221; G06F 2213/0042; G06F 11/3068
  See application file for complete search history.

(56) References Cited

U.S. PATENT DOCUMENTS 6,593,768 B1 7/2003 Iyer et al.
7,418,524 B2 8/2008 Beasley et al.
(Continued)

FOREIGN PATENT DOCUMENTS

CN 102855169 B 10/2014
EP 2530601 A2 5/2012
WO WO2011124049 A1 10/2011

OTHER PUBLICATIONS

Search Report for PCT PCT/US14/12925, dated Jul. 10, 2014 (1 page).

(Continued)

*Primary Examiner* — Ernest Unelus
(74) *Attorney, Agent, or Firm* — William B. Kempler; Charles A. Brill; Frank D. Cimino

(57) ABSTRACT

A Universal Serial Bus (USB) adapter includes a USB hub and a USB switch. The USB hub includes a plurality of downstream ports and one upstream port. The USB switch includes a plurality of connections that comprise a first connection configured to be coupled to a first USB apparatus, a second connection configured to be coupled to a second USB apparatus, a third connection coupled to the USB hub's upstream port, and a fourth connection coupled to one of the USB hub's downstream ports. The USB switch is configured to establish a first communication path between the first and second connections that bypasses the USB hub based on a determination that the first USB apparatus is to operate as a USB host, and to establish a second communication path through the USB hub based on a determination that the first USB apparatus is to operate as a client device.

15 Claims, 4 Drawing Sheets

(52) U.S. Cl.
CPC ...... *G06F 13/4027* (2013.01); *G06F 13/4221* (2013.01); *G06F 2213/0042* (2013.01)

(56) References Cited

U.S. PATENT DOCUMENTS

| | | |
|---|---|---|
| 7,805,559 B1 | 9/2010 | Stumpf et al. |
| 8,185,682 B2 | 5/2012 | Bandholz et al. |
| 2006/0026333 A1 | 2/2006 | Parr et al. |
| 2011/0093634 A1 | 4/2011 | Minami |
| 2011/0221521 A1 | 9/2011 | Razzell et al. |
| 2012/0311359 A1 | 12/2012 | Jaramillo |
| 2012/0317446 A1 | 12/2012 | Jaramillo |
| 2013/0179604 A1* | 7/2013 | Lai .................... G06F 11/3068 710/16 |

OTHER PUBLICATIONS

Office Action (in Japanese) for Japanese Patent Application No. 2015-555339, dated Dec. 19, 2017 (4 pages).
Search Report for Chinese Patent Application No. 201580005450.8 (14 pages).

* cited by examiner

USB SWITCH WITH MULTI-ROLE PORTS

CROSS-REFERENCE TO RELATED APPLICATIONS

The present application claims priority to U.S. Provisional Patent Application No. 61/937,191, filed Feb. 7, 2014, titled "SMART USB 2.0 SWITCH THAT SWITCHES TRAFFIC BASED ON A DEVICE OR A HOST CONNECTION," which is incorporated herein by reference in its entirety.

BACKGROUND

The Universal Serial Bus (USB) protocol is a host-centric protocol in which a host initiates transactions with a client device. That is, the client device cannot initiate transactions on the bus. USB On The Go (OTG) is protocol that permits role reversal in which either USB device can be a host or a client device. That is, the USB controller of one device can operate as a host while the USB controller of the other device operates as a client device, or vice versa. USB OTG allows USB devices such as printers or smart phones to act as a host while allowing other USB devices such as USB flash drives or cameras to be attached to them. The use of USB OTG allows the roles of such devices to switch back and forth between host and client device. For example, a smart phone may operate as a host device to read data from a removable media, but then present itself as a USB mass storage device (client device) when connected to a host computer. The role reversal capability of USB OTG is problematic in the context of a USB hub whose ports are typically statically defined as host or client device ports.

SUMMARY

A Universal Serial Bus (USB) adapter includes a USB hub and a USB switch. The USB hub includes a plurality of downstream ports and one upstream port. The USB switch includes a plurality of connections that comprise a first connection configured to be coupled to a first USB apparatus, a second connection configured to be coupled to a second USB apparatus, a third connection coupled to the USB hub's upstream port, and a fourth connection coupled to one of the USB hub's downstream ports. The USB switch is configured to establish a first communication path between the first and second connections that bypasses the USB hub based on a determination that the first USB apparatus is to operate as a USB host, and to establish a second communication path through the USB hub based on a determination that the first USB apparatus is to operate as a client device.

In another embodiment, a Universal Serial Bus (USB) switch includes a state machine, a first switch logic unit to be coupled to a first USB apparatus, a second switch logic unit coupled to the first switch logic unit and to be coupled to a second USB apparatus, and a plurality of connections. The connections include a first connection configured to be coupled to the first USB apparatus, a second connection configured to be coupled to the second USB apparatus, a third connection to be coupled to an upstream port of a USB hub, and a fourth connection to be coupled to a downstream port of the USB hub. The state machine is configured to control the first and second switch logic units to establish a first communication path between the first and second connections that bypasses the third and fourth connections based on a determination that the first USB apparatus is to operate as a USB host, and to control the first and second switch logic units to establish a second communication path through the USB hub based on a determination that the first USB apparatus is to operate as a client device.

In yet another embodiment, a method includes determining whether data signal lines associated with a USB port are logic 0. Upon determining that the data signal lines are not both logic 0, the method further includes configuring a data path through a USB switch to include a USB hub. If, however, it is determined that the data signal lines are both logic 0, the method includes configuring a data path through a USB switch to exclude the USB hub. In some implementations, configuring the data path through the USB switch to exclude the USB occurs also after actively determining whether a USB apparatus is connected to the USB port.

BRIEF DESCRIPTION OF THE DRAWINGS

For a detailed description of exemplary embodiments of the invention, reference will now be made to the accompanying drawings in which.

DETAILED DESCRIPTION

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
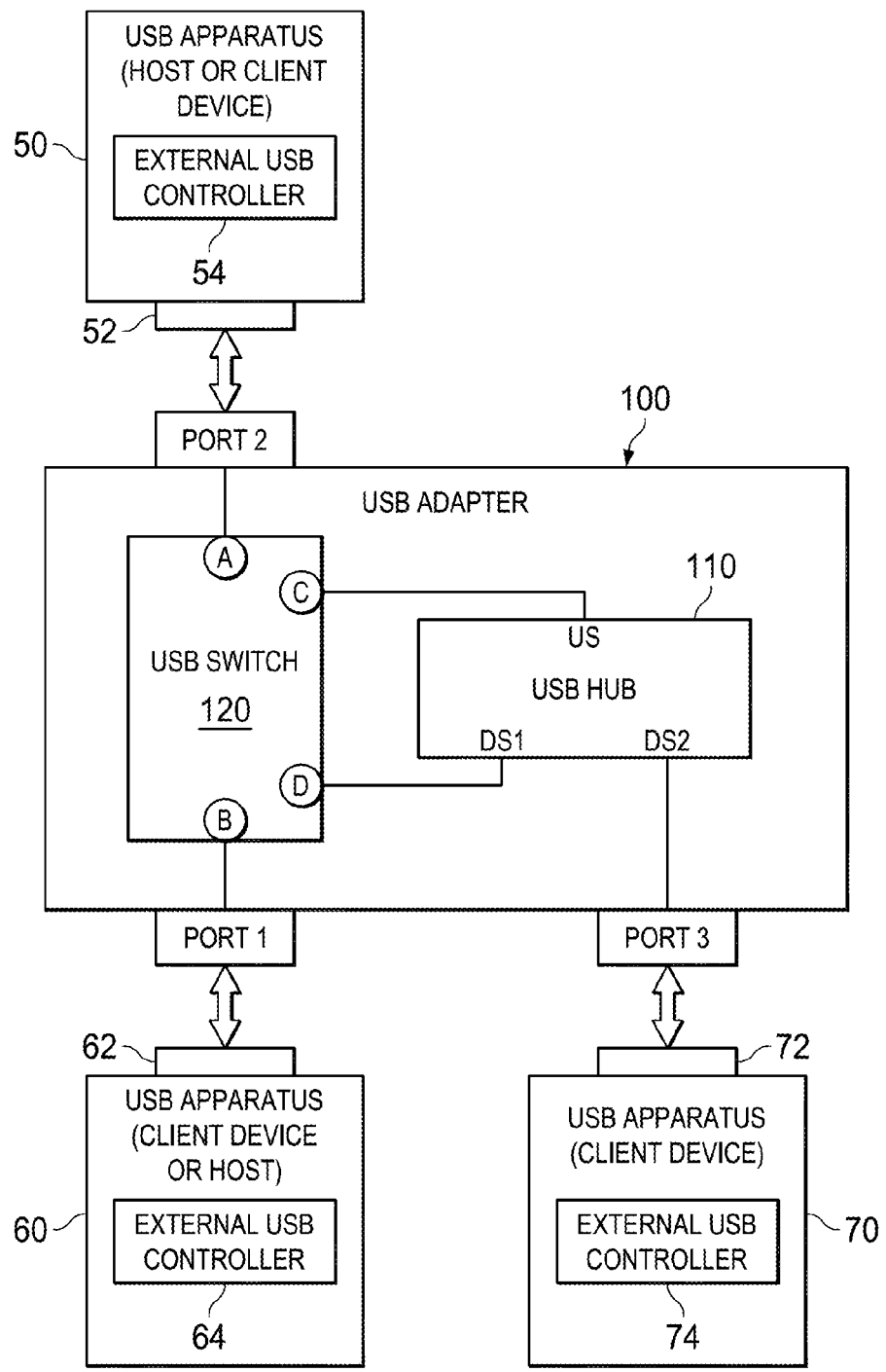
FIG. 1 illustrates a system diagram of a USB adapter which includes a USB switch and USB hub to implement USB OTG in accordance with an example.

The embodiments described herein include a USB adapter in which a communication path is created between USB ports based on the roles that the adapter detects for USB devices connected to it. FIG. 1, for example, illustrates a USB adapter 100 which includes three USB ports designated as Port 1, Port 2, and Port 3. More than three USB ports are possible as well. Two of the ports—Port 1 and Port 2—are configured to connect to a USB apparatus (the term "apparatus" is used instead of "device" to avoid confusion with the term "client device") that can operate as either a "host" or a "client device." A host is able to initiate transactions over a USB, but not client devices. Client devices can respond to a host that initiates a transaction. Thus, each of USB apparatuses 50 and 60 can function as either a host or a client device. USB apparatus 70 connected to Port 3 operates only as a client device in this example and not as a host.

Each USB apparatus 50, 60 and 70 includes an external USB controller (external with respect to the USB adapter). For example, USB apparatus 50 includes external USB controller 54, while USB apparatuses 60 and 70 have external USB controllers 64 and 74, respectively. Each USB controller 54, 64, 74 controls access to the bus on behalf of the respective USB apparatus 50, 60, 70. Each USB apparatus also includes a USB connector which can be connected to a corresponding port on the USB adapter 100, either directly or through a cable. In the illustrative configuration in FIG. 1, the USB connector 52 of USB apparatus 50 can be connected to Port 2 of the USB adapter. Similarly, the USB connector 62 of USB apparatus 60 can be connected to Port 1 of the USB adapter 100, while the USB connector 72 of USB apparatus 70 can be connected to Port 3 of the USB adapter.

FIG. 1 illustrates that the USB adapter 100 includes a USB switch 120 coupled to a USB hub 110. The USB switch 120 includes four connections designated as A, B, C, and D, although a different number of connections may be provided in other implementations. A USB apparatus, such as USB apparatus 50, can be coupled to connection A of the USB switch via Port 2. USB apparatus 60 can be coupled to connection B via Port 1, while USB apparatus 70 can be coupled to Port 3.

The USB hub 110 includes an upstream (US) port 110 and two downstream ports—DS1 and DS2. Additional downstream ports are possible in other examples. Downstream port DS2 is connected to Port 3 and thus to USB apparatus 70, which only is permitted to operate as a client device. The upstream port (US) is coupled to connection C of the USB switch 120. The other downstream port (DS1) is coupled to connection D of the USB switch 120.

The USB switch 120 includes internal switch logic units that establish one of two data paths depending on the roles of USB apparatuses 50 and 60. For example, if USB apparatus 50 is to function as a host with USB apparatus 60 functioning as a client device, the USB switch 120 configures its internal switch logic units to establish a data path through the USB hub 110. That is, data packets from USB apparatus 50 (operating as the host) are routed to USB apparatus 60 (client device) along the following path: Port 2-connection A-connection C-US-DS1-connection D-connection B-Port 1. Data packets from USB apparatus 60 (client device) to USB apparatus 50 (host) are routed along the same path albeit in the opposite direction. Further, USB apparatus 50 (host) can access USB apparatus 70 (client device) through the USB hub 110 as well via a data path comprising: Port 2-connection A-connection C-US-DS2-Port 3, with communications from the USB apparatus 70 (client device) back to the USB apparatus 50 (host) along the same path, but in the opposite direction.

On the other hand, if the roles of USB apparatuses 50 and 60 are reversed, with USB apparatus 60 operating as the host and USB apparatus 50 operating as the client device, the USB switch 120 configures its internal switch logic units to implement a data path that bypasses the USB hub 110. That is, all traffic between USB apparatuses 50 and 60 are routed directly between connections A and B and without flowing through the USB hub 110. More specifically, data packets from the USB apparatus 60 (host) are routed to USB apparatus 50 (client device) along the following path: Port 1-connection B-connection A-Port 2. Data packets from USB apparatus 50 (client device) to USB apparatus 60 (host) are routed along the same path albeit in the opposite direction. Port 3 in this configuration would not be used for data communications, but still can be used for charging a battery.

In accordance with the embodiments described herein, the USB switch 120 determines the roles of the USB apparatuses 50, 60 connected to the USB adapter 100, and configures itself as described above. The determination of the roles of the connected USB apparatuses may be performed at a power-on reset (POR) event and/or upon detection of an apparatus being disconnected from the USB adapter 100.

Figure 2:
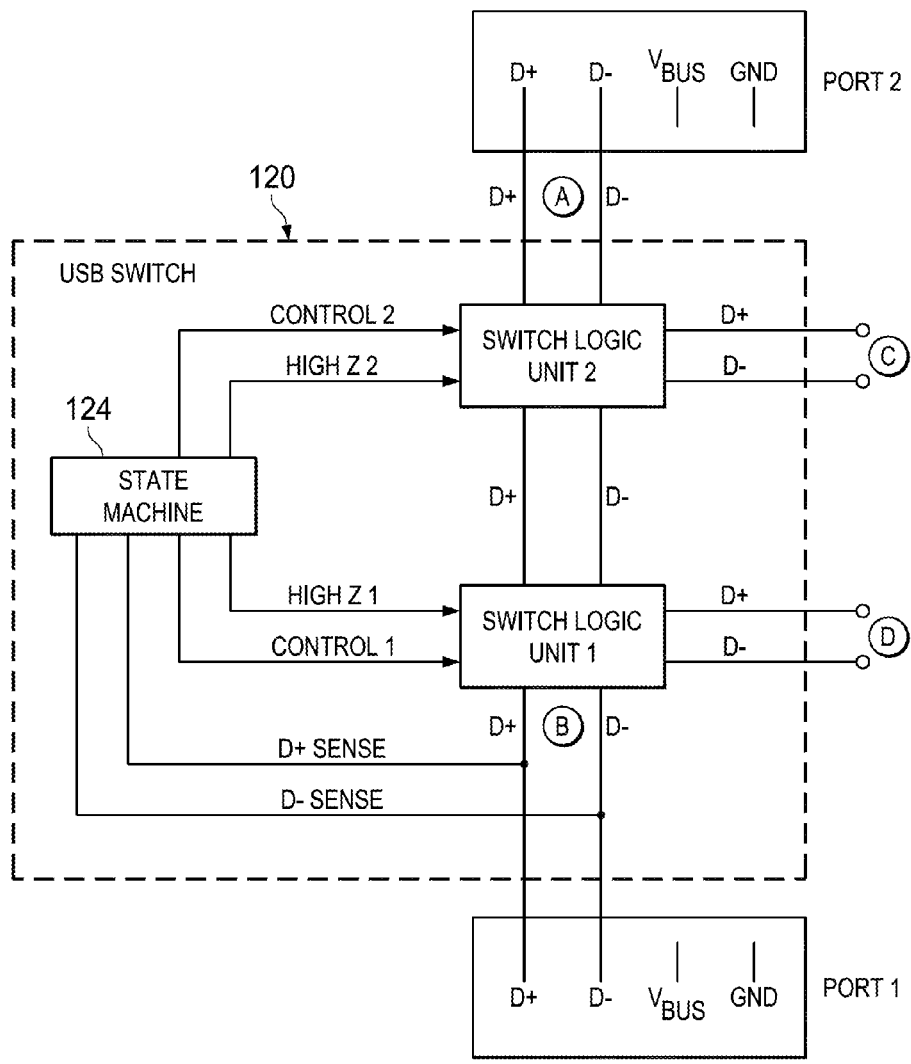
FIG. 2 shows a block diagram of the USB adapter in accordance with an example.

FIG. 2 shows a block diagram illustrating a possible implementation of the USB switch 120. The USB switch 120 in this example includes a state machine 124 coupled to switch logic unit 1 and switch logic unit 2. The USB in this example is a 4-wire bus including two power wires ($V_{Bus}$ and GND) and two data signals designated as D+ and D−. D+ and D− comprise a differential signal pair. The USB also may include USB 3.1 data. The data signals D+ and D− from Port 2 are provided to switch logic unit 1. Switch logic unit 2 operatively couples D+ and D− from Port 2 to either the D+/D− signals of connection C or to the other switch logic unit 1 as shown. The state machine 124 generates a CONTROL 2 signal to configure the switch logic unit 2 so that Port 2 couples either to connection C or to switch logic unit 1.

Similarly, data signals D+ and D− from Port 1 are provided to switch logic unit 1 and can be operatively coupled to either the D+/D− signals of connection D or to the other switch logic unit 2. The state machine 124 generates a CONTROL 1 signal to configure the switch logic unit 1 so that Port 1 couples either to connection D or to switch logic unit 2. In some examples, a single control signal may be used to configure the switch logic units rather than two separate control signals CONTROL 1 and CONTROL 2.

Switch logic unit 1 and switch logic unit 2 are configurable by the state machine 124 via the CONTROL 1 and CONTROL 2 signals, respectively, to establish the appropriate data paths as described above.

The state machine 124 receives input sense signals form Port 1 to aid the state machine in determining the role of the USB apparatus 60 connected to Port 1. The D+ SENSE signal connects to the D+ pin on Port 1 and the D− SENSE signal connects to the D− pin on Port 1. The state machine 124 uses these sense lines to determine whether a USB apparatus is connected to Port 1 and its role. Based on determining that an apparatus is connected to Port 1 and its role (host versus client device), the state machine 124 configures the switch logic units 1 and 2 to implement one of the two data paths noted above. In some examples, the role of an apparatus connected to the opposite port (Port 2) may also be ascertained to confirm its role is compatible with the role determined for the apparatus connected to Port 1.

In accordance with the USB specification, a host USB apparatus is to include pull-down resistors (e.g., 15 kohms) on both of its D+ and D− signal lines. A USB low speed client device is to include a pull-up resistor on its D− signal line but not on its D+ signal line. A USB full speed or high speed client device is to include a pull-up resistor on its D+ signal line but not on its D− signal line. As such, both of the D+ and D− signal lines will be at a logic 0 level for a host.

However, for a client device one of the signal lines will be a logic 1 while the other is a logic 0 depending on whether the client device is a low speed or full/high speed device. Thus, the state machine 124 can determine the role of the external USB controller of the USB apparatus connected to Port 1 by determining the logic state of the D+ and D− signal lines on that port.

Determining the logic state of the D+ and D− signal lines on Port 1 to both be 0, however, is not enough information to determine that a host is actually connected to the port. Whether a host is connected to the port or no apparatus at all is connected, a logic 0 will be present on both sensed data lines. Thus, the state machine 124 performs an active detection process in which it injects a known current on to one or both of the data signal lines and measures the resulting voltage. The resulting voltage will be within a predetermined range if a pull-down resistor is present or at a different voltage level if no pull-down resistor is present (which would be the case if no apparatus is connected). By injecting a current onto one or both of the D+ and D− signal lines and measuring the resulting voltage, the state machine 124 can determine whether or not an apparatus is connected to Port 1. By sensing the logic state of the D+ and D− signal lines on Port 1 and performing an active detection process, the state machine can determine whether an apparatus is connected to the port as well as its role (host versus client device). If a client device is connected to the port, as would be indicated by a logic 1 on one of the data signal lines but not both, there may be no need to perform the active detection process, as the logic 1 can only occur if a USB apparatus operating as a client device is connected to the port.

Figure 3:
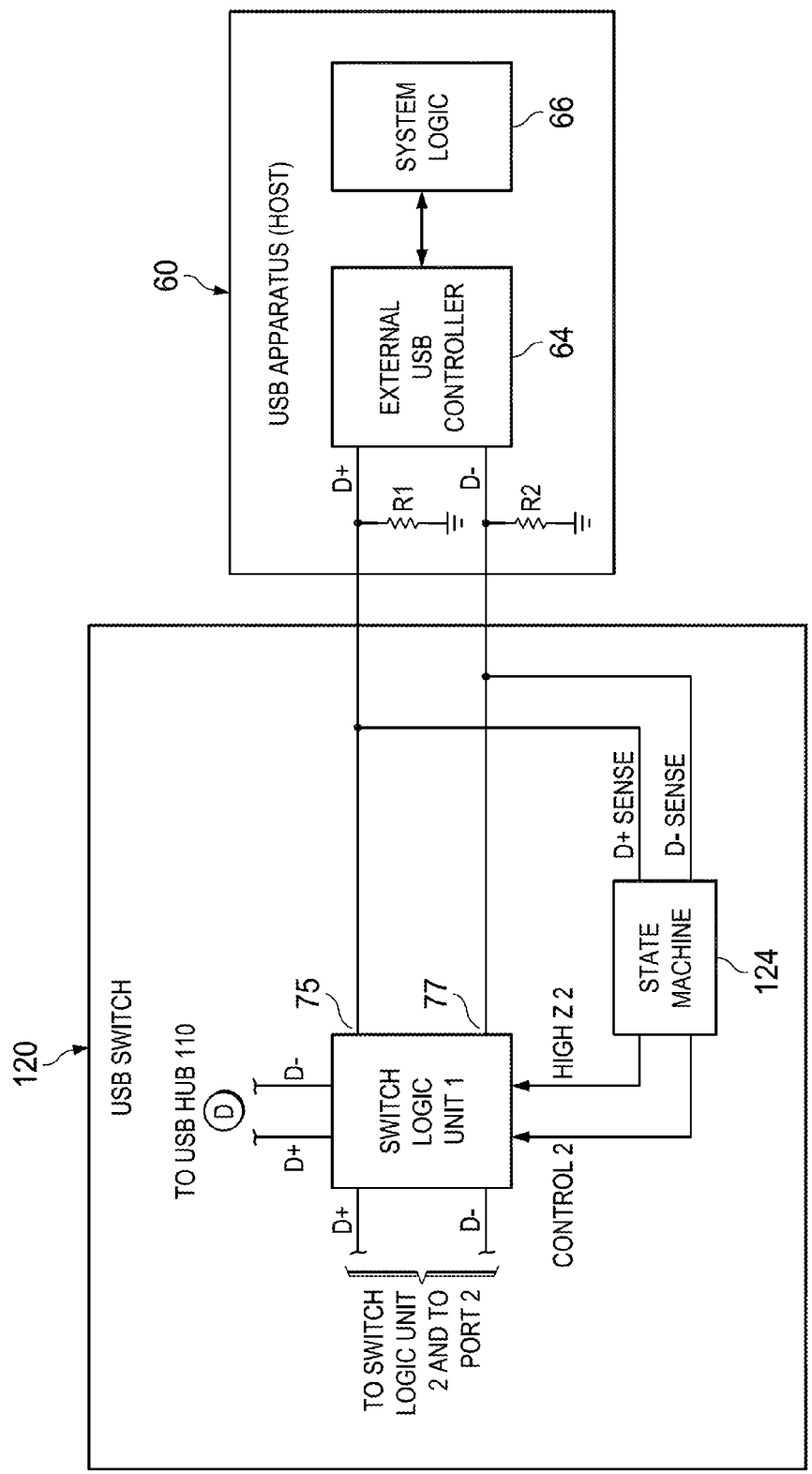
FIG. 3 shows an example of a USB apparatus configured as host.

FIG. 3 illustrates the USB apparatus 60 connected to the switch logic unit 2 through Port 1 (not specifically shown) and, via the D+ SENSE and D− SENSE signals to the state machine 124. The power ($V_{Bus}$) and ground (GND) pins are not shown for simplicity, and because the power and ground lines are not routed through the switch logic units 1 and 2 anyway. The USB apparatus includes the external USB controller 64 coupled to system logic 66 which causes the USB apparatus to perform whatever function(s) it is intended to perform. In this example, the USB apparatus 60 is operating as a host and thus includes pull-down resistors R1 and R2 on its D+ and D− pins as shown. The state machine 124 can sense the logic state of the D+ and D− pins via the D+ SENSE and D− SENSE signals. To determine the logic state of the D+ and D− pins to thereby ascertain the role of the USB apparatus 60, the switch logic unit 2 should have its connections to the USB apparatus 60 tri-stated (i.e., high impedance) to avoid any apparatus and their pull-up or pull-down resistors from influencing the native logic state of the D+ and D− pins of apparatus 60 due to the resistors R1 and R2. Before the state machine 124 senses the logic state on the D+ and D− pins, the state machine asserts the HIGHZ 2 signal to the switch logic unit 1 which causes the switch logic unit 2 to force its outputs 75 and 77 to high impedance states. The same is also true for switch logic unit 2, that is, the state machine causes its data outputs to switch logic unit 1, to be tristated via the HIGHZ 2 signal (FIG. 2). Once the state machine senses the logic state on the D+ and D− pins, the state machine deasserts the HIGHZ 1 and HIGHZ 2 signals to the switch logic units 1 and 2.

Figure 4:
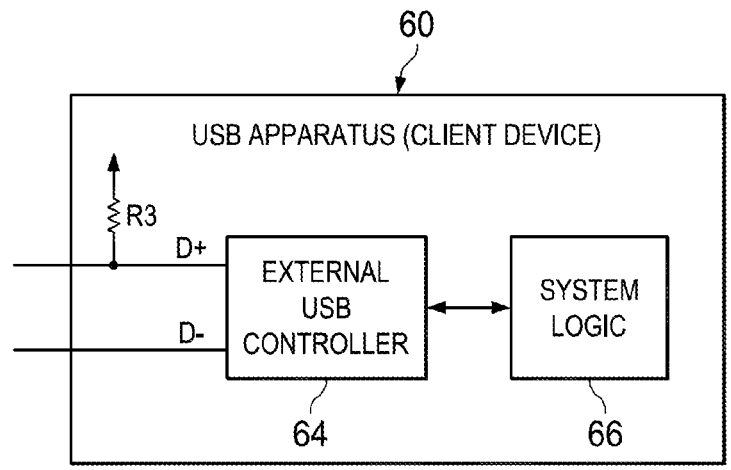
FIG. 4 shows another example of USB apparatus configured as a client device.

FIG. 4 is similar to FIG. 3 but illustrates that USB apparatus 60 is operate as a client device. In this particular example, the USB apparatus 60 operates as full or high speed client device. As such, a pull-up resistor R3 is provided on the D+ pin, but not on the D− pin. If the role of the USB apparatus 60 were to be that of a low speed client device, pull-up resistor R3 would have been connected to the D− pin, not the D+ pin.

The state machine 124 configures the switch logic units 1 and 2 to establish a communication path between the connections A and B and bypassing the USB hub (via connections C and D) based on a determination that the USB apparatus 60 and its external USB controller 64 connected to Port 1 are to operate as a USB host and that the USB apparatus 50 is to operate as a client device. In some implementations it is assumed that a USB apparatus connected to Port 1 operating as a host means that any USB apparatus 50 connected to Port 2 is to operate as a client device, and thus no specific sensing of the data lines of Port 2 is necessary to confirm that USB apparatus 50 is indeed a client device.

On the other hand, the state machine 124 configures the switch logic units 1 and 2 to establish a communication path through the USB hub (via connections C and D) based on a determination that the USB apparatus 60 (and its external USB controller 64) connected to Port 1 is to operate as a client device, and by implication that USB apparatus 50 (and its external USB controller 54) operating as a host. As noted above, no separate monitoring of the data pins on Port 2 is needed to confirm that USB apparatus 50 is indeed a host.

Figure 5:
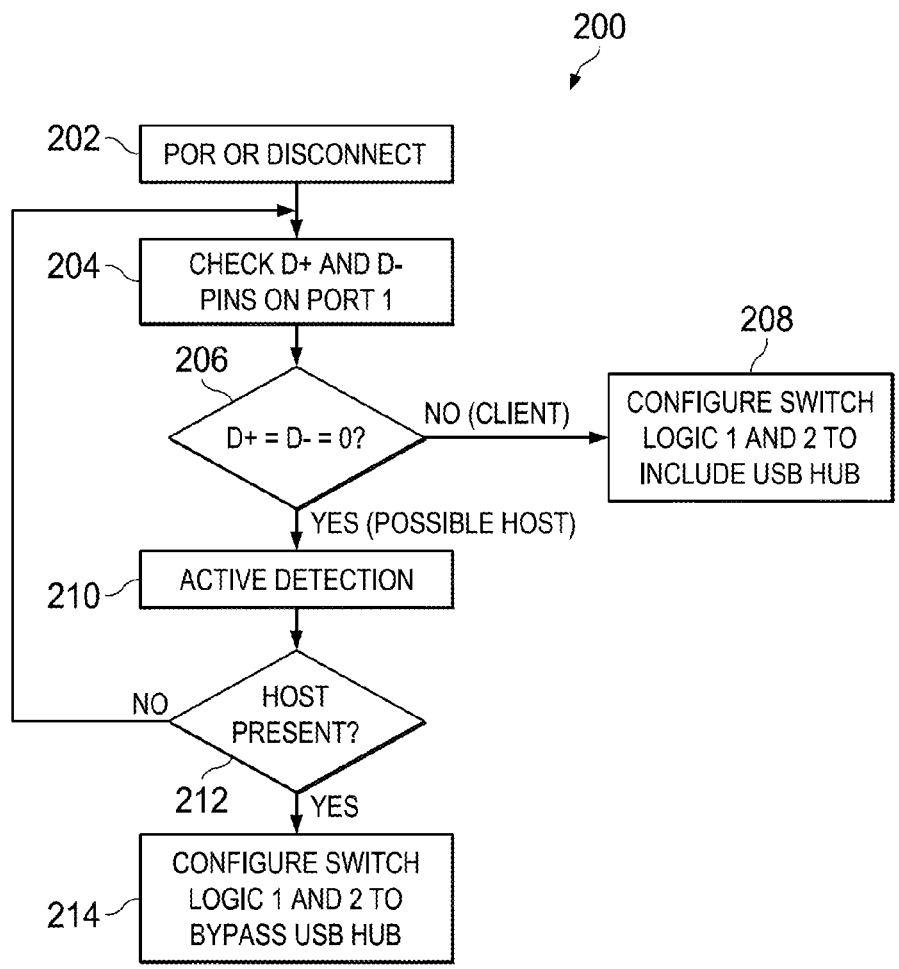
FIG. 5 shows a method of configuring the USB adapter upon a power on or disconnect event in accordance with an example.

FIG. 5 shows a method 200 to be performed by the state machine 124 of the USB switch 120. The method begins (200) by either a power-on reset (POR) event occurring or a disconnect event (i.e., when a USB apparatus 50 or 60 is disconnected). At 204, the method includes the state machine checking the logic state of the D+ and D− pins on Port 1. If the state machine determines at 206 that the data pins are not both a logic 0 ("no" branch), then at least one of the pins is a logic 1 which is indicative of the USB apparatus connected to Port 1 being a client device. That the apparatus on Port 1 is a client device implies any device connected or to be connected to Port 2 is to operate as a USB host. Consequently, at 208, the state machine 124 configures the switch logic units 1 and 2 to establish a communication path through connections A, C, D, and B to thereby include the USB hub 110.

However, if the state machine determines at 206 that the data pins are both at a logic 0 level ("yes" branch), then the possibility exists that a USB apparatus is connected to Port 1 and its role is that of a USB host. However, the method 200 further operates to confirm that an apparatus is actually connected to the port. Thus, at 210, the method includes performing an active detection process which, as described in the example above, determines whether an apparatus is connected to the port. If an apparatus is connected, as determined at 212, than that apparatus is determined to be a host, which means that any apparatus connected, or to be connected, to the opposite Port 2 is a client device. As such, the state machine 124 configures the switch logic units 1 and 2 to establish a communication path between the connections A and B (i.e., Ports 2 and 1) to thereby bypass the USB hub 110.

If, at 212, the result of the active detection process is that no apparatus is detected, then control loops back to 204 at which the data pins of Port 1 again checked and the method repeats.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A Universal Serial Bus (USB) adapter, comprising:
a USB hub including a plurality of downstream ports and one upstream port; and
a USB switch coupled to the USB hub, the USB switch including a plurality of connections, the connections including:
a first connection configured to be coupled to a first USB apparatus;
a second connection configured to be coupled to a second USB apparatus;
a third connection coupled to the USB hub's upstream port; and
a fourth connection coupled to one of the USB hub's downstream ports;
wherein the USB switch is configured to:
establish a first communication path between the first and second connections that bypasses the USB hub based on a determination that the first USB apparatus is to operate as a USB host; and
establish a second communication path between the first and second connections, the second communication path being established through the USB hub via the third and fourth connections based on a determination that the first USB apparatus is to operate as a client device.

2. The USB adapter of claim 1 wherein the USB switch includes a plurality of switch logic units controllable by a state machine to establish the first and second communication paths based on the determination as to whether the first USB apparatus is to operate as a USB host or as a client device.

3. The USB adapter of claim 1 further comprising a state machine configured to determine whether the first USB apparatus is to operate as a host or a client device and configure the USB switch to establish the corresponding communication path.

4. The USB adapter of claim 3 wherein the state machine is configured to determine whether the first USB apparatus is to operate as a host or a client device by determining the logic state of data signal lines of the first port.

5. The USB adapter of claim 4 wherein the state machine is configured to determine that the first USB apparatus is to operate as a host upon determining that the logic state of the data signal lines are logic 0 and, upon determining that the logic state of the data signal lines are logic 0, the state machine is configured to perform an active detection process to determine whether a USB apparatus is connected to the first port.

6. The USB adapter of claim 4 wherein the USB switch includes a plurality of switch logic units connected to the first and second connections and controllable by the state machine to implement the corresponding communication path, and wherein the state machine is configured to cause outputs of the switch logic units to the corresponding ports to be tristated when determining the logic state of the data signal lines.

7. The USB adapter of claim 1 wherein another of the USB hub's downstream ports is configured to be connected to a USB apparatus that only operates as a client device.

8. A Universal Serial Bus (USB) switch, comprising:
a state machine;
a first switch logic unit to be coupled to a first USB apparatus, the first USB apparatus being a USB host or USB client device;
a second switch logic unit coupled to the first switch logic unit and to be coupled to a second USB apparatus; and
a plurality of connections, the connections including:
a first connection configured to be coupled to the first USB apparatus;
a second connection configured to be coupled to the second USB apparatus;
a third connection to be coupled to an upstream port of a USB hub communicating data to the upstream port; and
a fourth connection to be coupled to a downstream port of the USB hub at least one downstream port being a USB host or USB client device;
wherein the state machine is configured to:
control the first and second switch logic units to establish a first communication path between the first and second connections that bypasses the third and fourth connections based on a determination that the first USB apparatus is to operate as a USB host; and
control the first and second switch logic units to establish a second communication path through the third and fourth connections based on a determination that the first USB apparatus is to operate as a client device.

9. The USB switch of claim 8 wherein the state machine is configured to determine whether the first USB apparatus is to operate as a host or a client device by determining the logic state of data signal lines of the first USB apparatus.

10. The USB switch of claim 9 wherein the state machine is configured to determine that the first USB apparatus is to operate as a host upon determining that the logic state of the data signal lines are logic 0 and, upon determining that the logic state of the data signal lines are logic 0, the state machine is configured to perform an active detection process to determine whether a USB apparatus is connected to the first port.

11. The USB switch of claim 9 wherein the state machine is configured to cause outputs of the first and second switch logic units to be tristated when determining the logic state of the data signal lines.

12. A method, comprising:
determining, by a USB switch, whether data signal lines associated with a USB port are logic 0, the USB switch comprising a plurality of connections, the plurality of connections including:
a first connection configured to be coupled to a first USB apparatus;
a second connection configured to be coupled to a second USB apparatus;
a third connection coupled to an upstream port of a USB hub; and
a fourth connection coupled to a downstream port of the USB hub;
upon determining that at least one of the data signal lines is a level other than logic 0, configuring a data path between the first and the second connections via the third and fourth connections through the USB switch to include the USB hub; and
upon determining that the data signal lines are both logic 0, configuring a data path between the first and second connections through the USB switch bypassing the USB hub.

13. The method of claim 12 further comprising, upon determining that the data signal lines are both logic 0, actively determining whether a USB apparatus is connected to the USB port before configuring the data path through the USB switch to exclude the USB hub.

14. The method of claim 13 wherein, upon actively determining that a USB apparatus is connected to the USB port, configuring the data path through the USB switch to exclude the USB hub, but upon actively determining that no USB apparatus is connected to the USB port, not configuring the data path through the USB switch to exclude the USB hub.

15. The method of claim 13 wherein actively determining whether a USB apparatus is connected to the USB port includes injecting a current onto at least one of the data signal lines and measuring the resulting voltage.

* * * * *